Nov. 28, 1944.   S. GUARNASCHELLI   2,363,586
FLEXIBLE TUBE COUPLING
Filed April 17, 1943   2 Sheets-Sheet 1
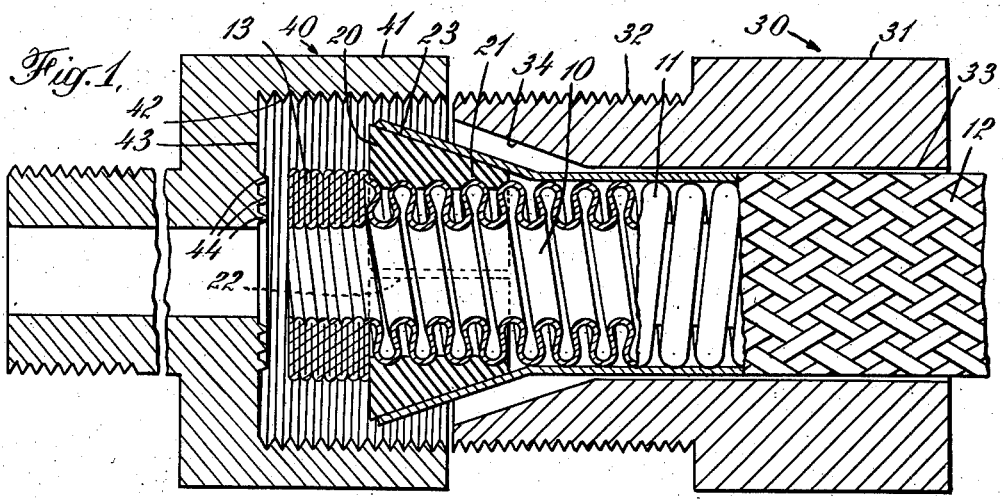
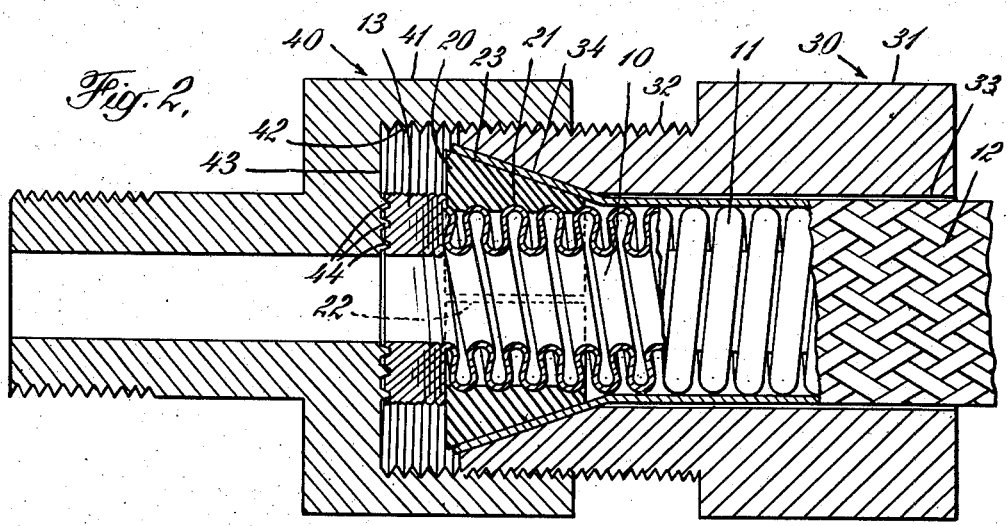
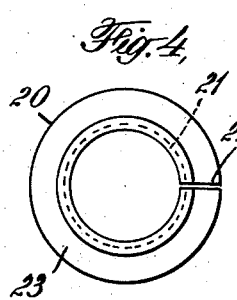
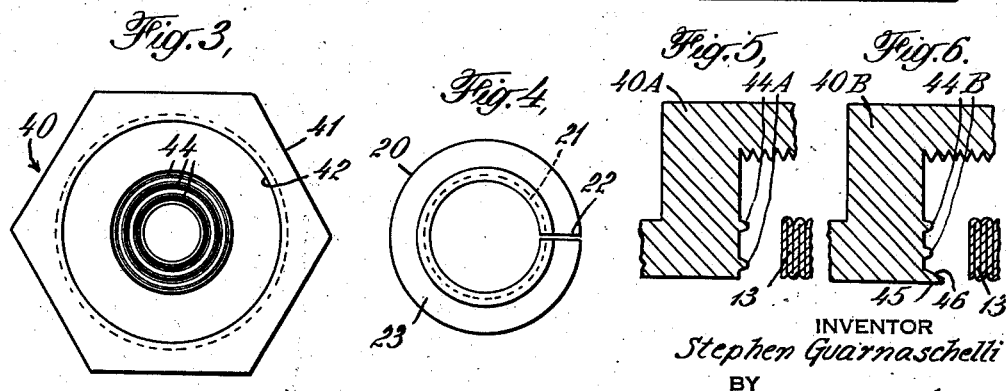
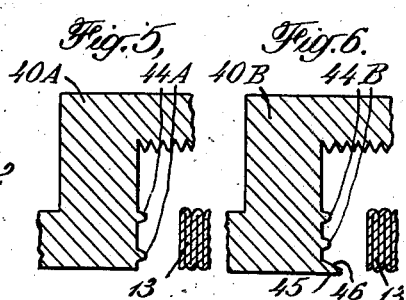
INVENTOR
Stephen Guarnaschelli
BY
E. W. Marshall
ATTORNEY Nov. 28, 1944.　　S. GUARNASCHELLI　　2,363,586
FLEXIBLE TUBE COUPLING
Filed April 17, 1943　　2 Sheets-Sheet 2
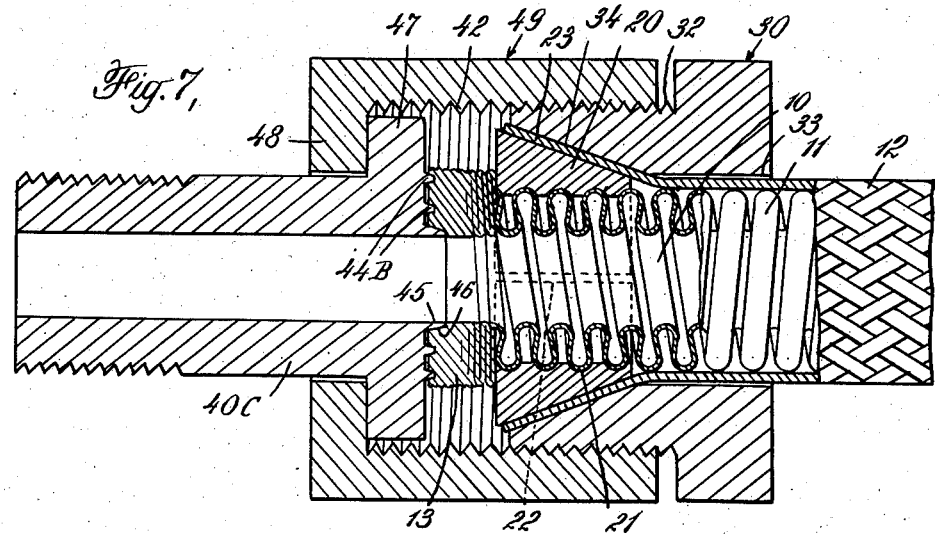
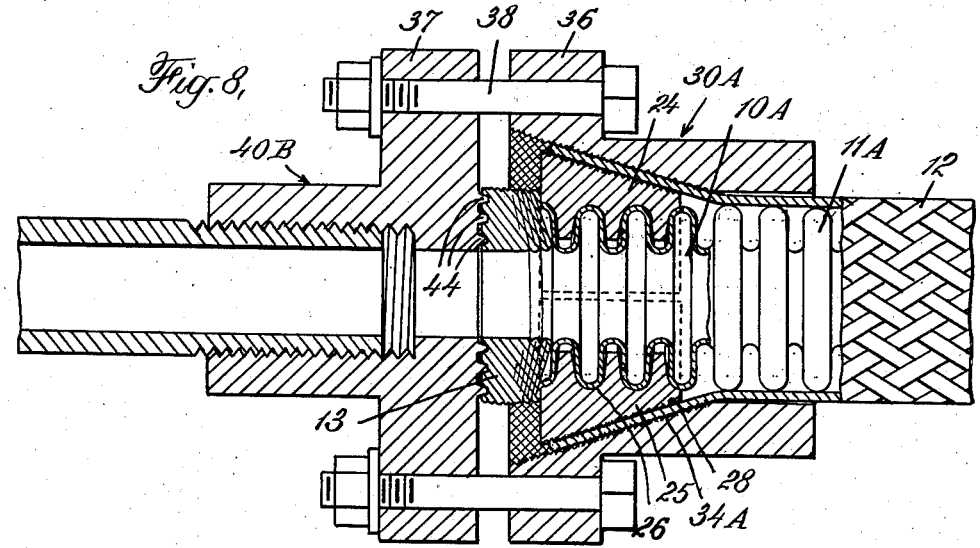
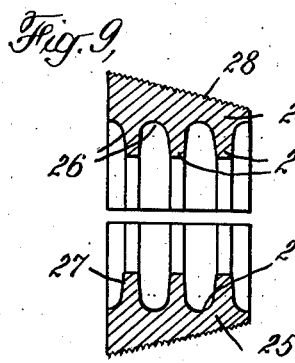
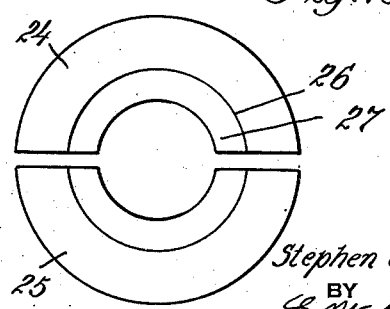
INVENTOR
Stephen Guarnaschelli
BY
E. W. Marshall
ATTORNEY Patented Nov. 28, 1944

2,363,586

UNITED STATES PATENT OFFICE 2,363,586

FLEXIBLE TUBE COUPLING

Stephen Guarnaschelli, Mount Vernon, N. Y., assignor to Packless Metal Products Corporation, New Rochelle, N. Y., a corporation of New York Application April 17, 1943, Serial No. 483,367

4 Claims. (Cl. 285—72)

This invention relates to improvements in flexible tube couplings for corrugated metallic tubes and its object is to provide simple coupling members for joining sections of such tubing or for connecting an end of such a tube to another pipe fitting or the like, and to form leak-proof joints. Another object is to so construct the device that the sheathing which is commonly used to cover the corrugated tube to strengthen it and prevent its elongation when subjected to internal pressure, will become securely locked to one of the couplings members.

This invention is an improvement over the flexible tube coupling disclosed and claimed in Reissue Patent No. 21,603, issued to me October 22, 1940. The device shown in said reissue is highly satisfactory for use with tubes of comparatively small diameter, but difficulties arise when attempts are made to apply it to large tubes.

I will describe my improvements in the following specification and point out its novel features in the appended claims.

Referring to the drawings:

Fig. 1 is a sectional elevation of a flexible tube and its overlying sheathing and parts of the novel coupling partly assembled.

Fig. 2 is a view similar to Fig. 1 with all of the parts assembled.

Fig. 3 is an end view of one of the coupling members.

Fig. 4 is an end elevation of a split ring which is shown in Figs. 1 and 2.

Figs. 5 and 6 are side elevations illustrating modifications of a portion of one of the coupling members.

Fig. 7 is a sectional elevation of a modified construction.

Fig. 8 is a similar view showing another construction of the coupling members with the device applied to a tube in which the corrugations are normal to the axis of the tube.

Fig. 9 is a sectional side elevation and Fig. 10 an end view of the two part collar shown in Fig. 8.

10 designates a seamless metallic tube which has been deformed into a series of spiral corrugations 11 to render it flexible. 12 is a braided wire sheathing which surrounds the tube.

As in the former case, I provide a collar 20, the inner surface of which is provided with spiral corrugations 21 of a pitch and shape which correspond to the outer corrugations 11 on the tube. The inner diameter of the collar is less than the outer diameter of the tube but the collar is split as at 22 so that it may be spread and screwed onto the tube. The outer surface 23 of the collar is conical.

30 is one of a pair of coupling members. The outer surface 31 of the body of this member may be flattened for wrench engagement. It has an externally threaded portion 32 of reduced diameter, a bore 33 which fits over the sheathing 12 and a conical end opening 34 which corresponds to the shape of the outer surface 23 of the collar.

The member 30 is first placed on the tube and then the collar 20 is screwed onto the tube from one of its ends until a part of the tube projects beyond the collar. The sheathing 12 is expanded over the outer surface of the collar. The engagement of the collar with the tube will prevent longitudinal relative movement of these parts and after the collar is thus disposed on the tube longitudinal pressure is applied to the end of the tube which extends beyond the collar to flatten it as shown at 13 in Fig. 1.

40 is the other coupling member. It has an enlarged end 41 which is provided with internal threads 42 which fit the threads on the part 32 of the coupling member 30. The outer surface of the part 41 may be flattened for wrench engagement. 43 is a transverse face back of the threads 42. A plurality of spaced annular ribs 44 project from this face opposite the flattened end 13 of the tube.

When the coupling members are screwed together the ribs 44 rotating on the end 13 of the tube become seated in the latter. Tightening the coupling members together further compresses the end 13 of the tube and forms it into a substantially solid mass with the ribs embedded in it as shown in Fig. 2. A joint thus made is leak-proof and capable of withstanding high pressure.

In the modification shown in Fig. 5 the coupling member 40A has two spaced annular ribs 44A, 44A, near the inner and outer peripheries of the compressed end 13 of the tube.

In the modification shown in Fig. 6 the coupling member 40B is constructed to have an inner projection 45, the inner diameter of which is slightly smaller than the inner diameter of the compressed end 13 of the tube so that it may enter the end of the tube. The outer surface 46 of this projection is tapered so that when the parts are assembled it forms a conical seat for the tube. In Fig. 6 the annular ribs 44B which abut against the end of the tubes are of rounded contour.

In the form of the invention shown in Figs. 1-4 the annular ribs 44 on the member 40 rotate on the compressed end 13 of the tube as the coupling members are drawn together and because of the small area of the ribs, the friction between the coupling member 40 and the end of the tube is small. The same is true of the modifications shown in Figs. 5 and 6.

In Fig. 7, I have shown the invention applied to a union type of coupling. In this case the ribs 44B and the projection 45 are shown like those in Fig. 6, but obviously this is not a necessary form. They project from the face of a coupling member 40C which in this case has an outwardly projecting annular flange 47 which is engaged by an end flange 48 on an internally threaded sleeve 49 screwed onto the coupling member 30.

In Fig. 8 the invention is shown as applied to a flexible tube 10A of which the corrugations 11A are normal to the axis of the tube and in this figure another type of coupling member is shown. The member 30A is provided with a flange 36 and the member 40B has a flange 37. These coupling members are drawn together by bolts 38 which pass through the flanges.

In this case a divided collar is used which comprises two parts, 24, 25, each of which has grooves 26 which fit over the outside of the corrugations 11A and fins 27 which extend into the spaces between the corrugations. The outer surfaces 28 of these parts are tapered. When such a two part collar is assembled on the tube and compressed between it and a conical surface 34A in the member 30A it is incapable of longitudinal movement on the tube. The tapered surfaces 28 of the collar and the conical surface 34A in the member 30A are shown roughened to better their grip on the sheathing 12. The operation of this arrangement is obvious.

This invention may be used with unlike metals. Tubes of the character described are usually made of soft metal such as copper and the split collar and the coupling members may be made of brass or from iron or steel.

The tubes are sometimes made of soft steel in which case the coupling member 40 is preferably made of harder steel and the split ring and other coupling member may be made of any desirable metal, such as brass, iron or steel. These and other modifications than those shown and described may be made within the spirit and scope of the invention and I intend no limitations other than those imposed by the following claims.

What is claimed is:

1. In a coupling for a flexible corrugated metallic tube, the end of the tube being longitudinally compressed and having a flat transverse surface, and a coupling member secured on the tube at the rear of the compressed portion thereof, a second coupling member having a flat transverse surface with an annular rib projecting therefrom onto the flat surface at the end of the tube and adapted to indent said surface and be embedded in the compressed portion of the tube when the coupling members are drawn toward each other.

2. In a coupling for a flexible corrugated metallic tube, the end of the tube being longitudinally compressed and having a flat transverse surface, and a coupling member secured on the tube at the rear of the compressed portion thereof, a second coupling member having a flat transverse surface with a plurality of spaced concentric ribs projecting therefrom onto the flat surface at the end of the tube and adapted to indent said surface and be embedded in the compressed portion of the tube when the coupling members are drawn toward each other.

3. In a coupling for a flexible corrugated metallic tube, the end of the tube being longitudinally compressed and having a flat transverse surface, and a coupling member secured on the tube at the rear of the compressed portion thereof, a second coupling member having a flat transverse surface and a tapered annular projection adapted to enter the end of the tube, and with an annular rib spaced inwardly from said tapered projection from said surface onto the flat surface at the end of the tube adapted to indent said surface and be embedded in the compressed portion of the tube and to oppose outward displacement of the end of the tube when the coupling members are drawn together.

4. In a coupling for a flexible corrugated metallic tube with a sheathing surrounding the tube and split collar having an outer conical surface and an inner surface shaped to engage the outer surface of the tube, the inner surface of the tube being longitudinally compressed and having a flat transverse surface and a coupling member secured on the tube at the rear of the compressed portion thereof with an inner conical surface adapted to wedgingly receive the outer surface of the collar with the sheathing interposed between the conical surfaces of the collar of said coupling member, said conical surfaces being roughened to grip the sheathing, a second coupling member having a flat transverse surface and a tapered projection adapted to enter the end of the tube and with a plurality of annular ribs spaced from said annular projection and from each other projecting from said surface onto the flat surface at the end of the tube adapted to indent said surface and be embedded in the compressed portion of the tube and to oppose outward displacement of the end of the tube when the coupling members are drawn together.

STEPHEN GUARNASCHELLI.